US012636926B2

(12) United States Patent (10) Patent No.: US 12,636,926 B2
Sagara et al. (45) Date of Patent: May 26, 2026

(54) CONTROL DEVICE, CONTROL METHOD, AND STORAGE MEDIUM

(71) Applicant: HONDA MOTOR CO., LTD., Tokyo (JP)

(72) Inventors: Masafumi Sagara, Tokyo (JP); Yuki Hara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 178 days.

(21) Appl. No.: 18/497,524

(22) Filed: Oct. 30, 2023

(65) Prior Publication Data

US 2024/0149628 A1 May 9, 2024

(30) Foreign Application Priority Data

Nov. 4, 2022 (JP) ................................. 2022-177187

(51) Int. Cl.
*B60G 17/0165* (2006.01)

(52) U.S. Cl.
CPC ...... *B60G 17/0165* (2013.01); *B60G 2400/25* (2013.01); *B60G 2400/80* (2013.01)

(58) Field of Classification Search
CPC ............ B60G 17/0165; B60G 2400/25; B60G 2400/80
USPC .......................................................... 701/37
See application file for complete search history.

(56) References Cited

U.S. PATENT DOCUMENTS

| | | | | | |
|---|---|---|---|---|---|
| 4,903,209 | A | * | 2/1990 | Kaneko ................ | B60G 17/017 280/DIG. 1 |
| 11,052,916 | B2 | * | 7/2021 | Tsukasaki ......... | B60W 50/0098 |
| 11,613,242 | B2 | * | 3/2023 | Miyaoka ........... | B60W 60/0016 701/93 |
| 2005/0021205 | A1 | * | 1/2005 | Niwa ................... | B60G 17/016 701/37 |
| 2008/0023927 | A1 | * | 1/2008 | Kim .................... | B60G 17/0155 280/5.514 |
| 2015/0142285 | A1 | * | 5/2015 | Nagata ............ | B60W 30/18154 701/70 |
| 2017/0151852 | A1 | * | 6/2017 | Ohashi ............... | B60G 17/0525 |
| 2017/0203628 | A1 | * | 7/2017 | Dames ................... | B60G 7/001 |

(Continued)

FOREIGN PATENT DOCUMENTS

| | | |
|---|---|---|
| CN | 114103580 A | 3/2022 |
| DE | 10 2017 111 054 A1 | 11/2018 |

(Continued)

OTHER PUBLICATIONS

Jan. 23, 2024, Translation of Japanese Office Action issued for related JP Application No. 2022-177187.

*Primary Examiner* — Logan M Kraft
*Assistant Examiner* — John D Bailey
(74) *Attorney, Agent, or Firm* — Paratus Law Group, PLLC

(57) ABSTRACT

A control device includes: an external environment recognition unit configured to acquire recognition data of an external environment of a moving body; a reception unit configured to receive selection of a target position from a user of the moving body; a movement control unit configured to execute movement control for moving the moving body to the target position based on the recognition data; and a height control unit configured to execute height control of the moving body in accordance with progress of the movement control.

13 Claims, 12 Drawing Sheets

(56) References Cited

U.S. PATENT DOCUMENTS

| | | | |
|---|---|---|---|
| 2018/0022346 A1* | 1/2018 | Murakami | B60G 17/015 |
| | | | 701/37 |
| 2022/0105773 A1* | 4/2022 | Kim | B60G 17/018 |
| 2022/0176768 A1 | 6/2022 | Hokai et al. | |
| 2022/0332306 A1* | 10/2022 | Noma | B62D 15/0265 |
| 2024/0383296 A1* | 11/2024 | Koumura | B60G 17/0152 |

FOREIGN PATENT DOCUMENTS

| | | |
|---|---|---|
| JP | 2001-287530 A | 10/2001 |
| JP | 2006-298115 A | 11/2006 |
| JP | 2022-091581 A | 6/2022 |

* cited by examiner (CONT.)

(FIG. 3 CONTINUED)
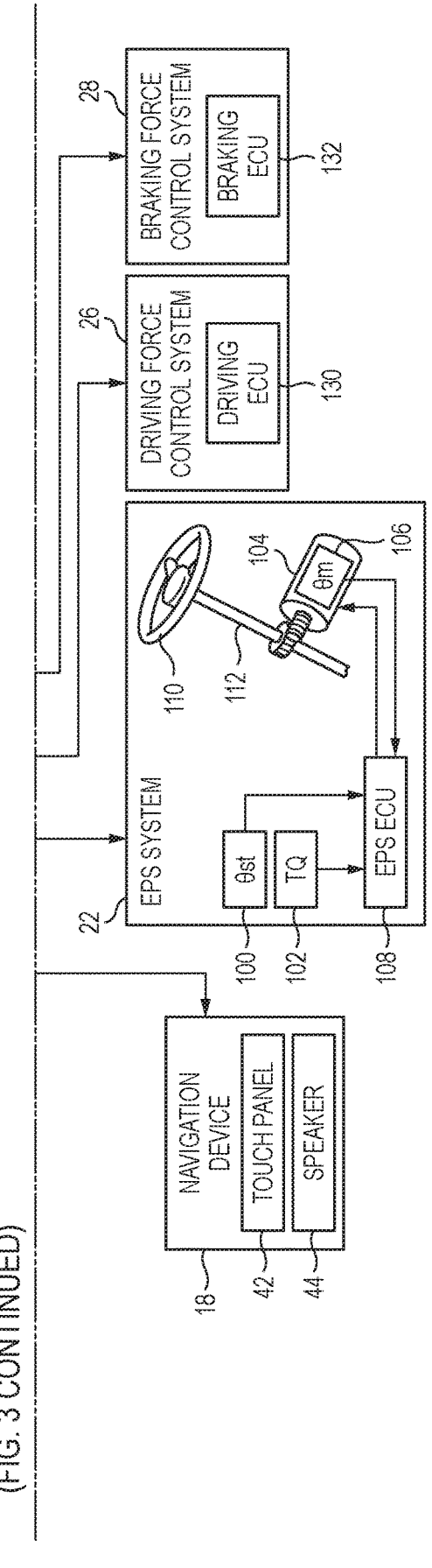

FIG. 10

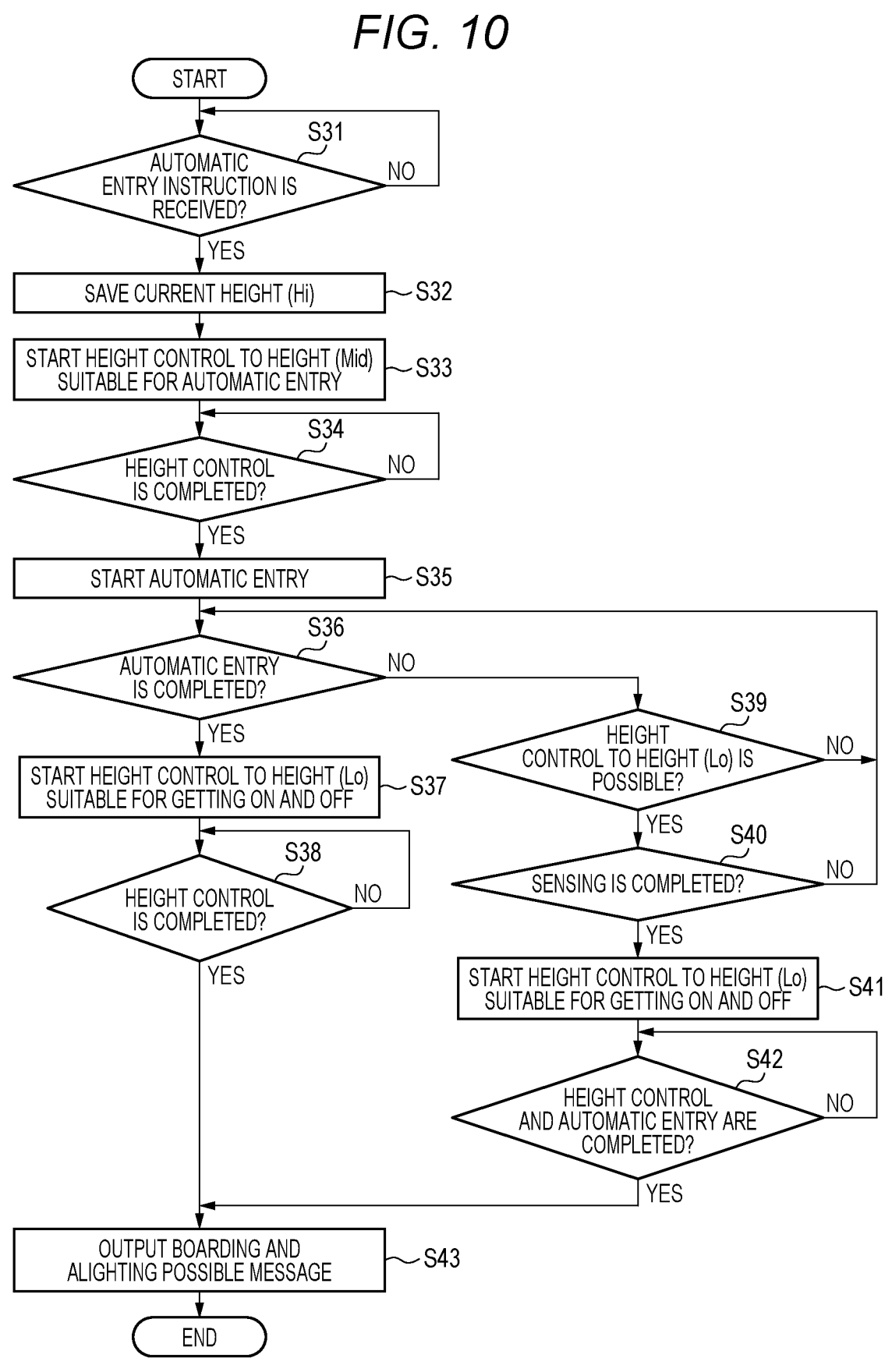

START

S31 — AUTOMATIC ENTRY INSTRUCTION IS RECEIVED? — NO

YES

SAVE CURRENT HEIGHT (Hi) — S32

START HEIGHT CONTROL TO HEIGHT (Mid) SUITABLE FOR AUTOMATIC ENTRY — S33

S34 — HEIGHT CONTROL IS COMPLETED? — NO

YES

START AUTOMATIC ENTRY — S35

S36 — AUTOMATIC ENTRY IS COMPLETED? — NO

YES

START HEIGHT CONTROL TO HEIGHT (Lo) SUITABLE FOR GETTING ON AND OFF — S37

S38 — HEIGHT CONTROL IS COMPLETED? — NO

YES

S39 — HEIGHT CONTROL TO HEIGHT (Lo) IS POSSIBLE? — NO

YES

S40 — SENSING IS COMPLETED? — NO

YES

START HEIGHT CONTROL TO HEIGHT (Lo) SUITABLE FOR GETTING ON AND OFF — S41

S42 — HEIGHT CONTROL AND AUTOMATIC ENTRY ARE COMPLETED? — NO

YES

OUTPUT BOARDING AND ALIGHTING POSSIBLE MESSAGE — S43

END (FIG. 11 CONTINUED)
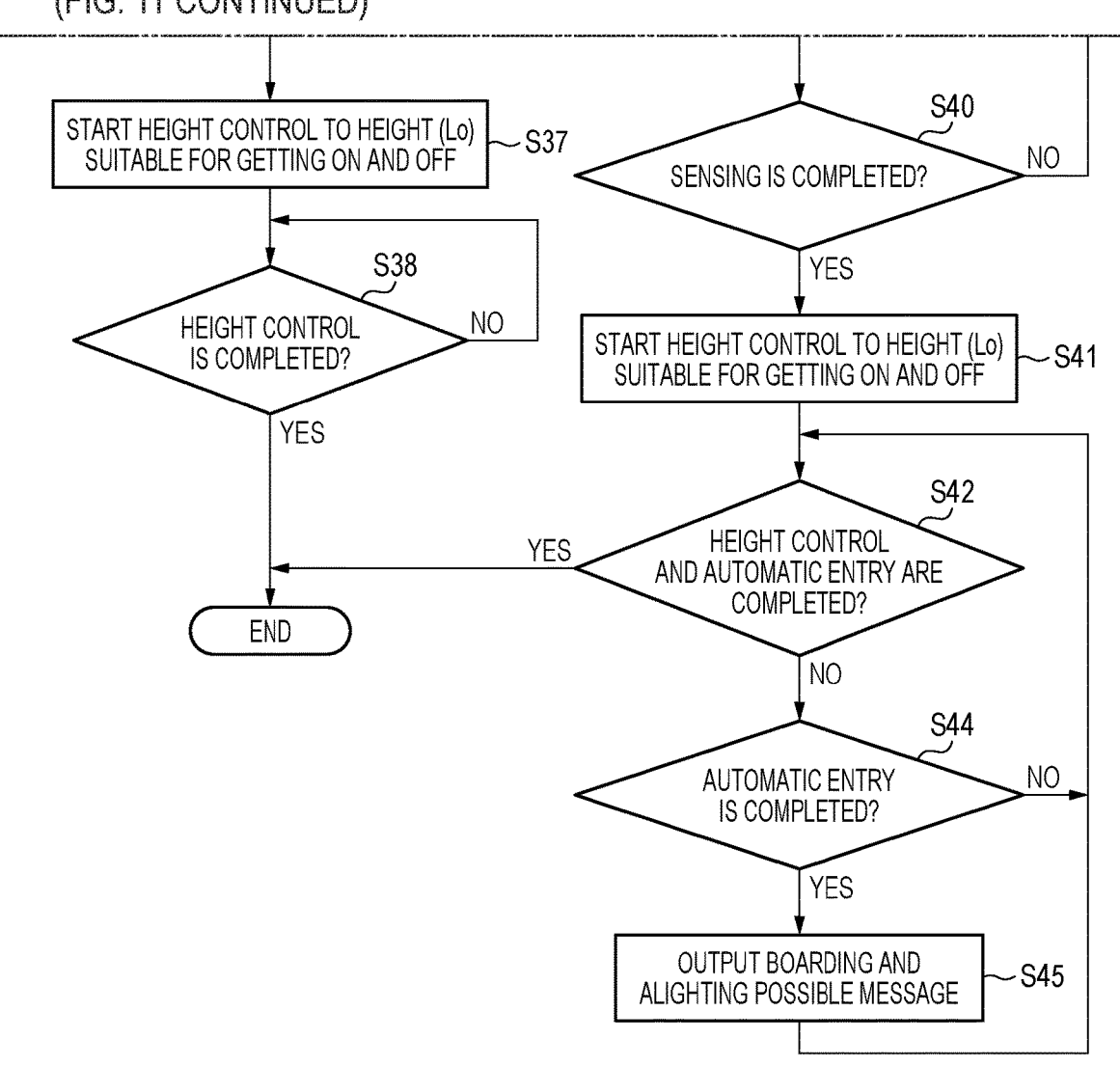

CONTROL DEVICE, CONTROL METHOD, AND STORAGE MEDIUM

This application is based upon and claims the benefit of priority from prior Japanese patent application No. 2022-177187, filed on Nov. 4, 2022, the entire contents of which are incorporated herein by reference.

TECHNICAL FIELD

The present disclosure relates to a control device, a control method, and a storage medium storing a control program.

BACKGROUND ART

In recent years, efforts have been actively made to provide access to a sustainable transportation system in consideration of vulnerable people among traffic participants. In order to implement the above, focus has been placed on research and development on further improving safety and convenience of traffic by research and development related to automatic driving technique.

In the related art, an automatic parking system that moves a vehicle to a target parking position acquired by a sensor such as a camera is known. There is also known a vehicle height adjustment system capable of adjusting a vehicle height through control by user operation or system. For example, JP2006-298115A describes a driving assistance device in which when a road surface near a parking target area has large unevenness and a driver increases and registers a vehicle height, a suspension control device is driven based on vehicle height adjustment data registered at the same timing to set a vehicle height to the registered vehicle height.

SUMMARY

According to the driving assistance device of JP2006-298115A, it is possible to adjust a vehicle height at the same timing as the past based on past travel history. However, JP2006-298115A does not describe vehicle height adjustment when a vehicle moves to the target parking position at the time of automatically entering a parking space or vehicle height adjustment when the vehicle moves from the target parking position at the time of automatically exiting a parking space. Therefore, there is room for improvement in the related art in this regard.

An aspect of the present disclosure is to provide a control device, a control method, and a storage medium storing a control program capable of appropriately adjusting a height of a vehicle when the vehicle moves to a target position under automatic movement control.

According to an aspect of the present disclosure, there is provided a control device including:

an external environment recognition unit configured to acquire recognition data of an external environment of a moving body;

a reception unit configured to receive selection of a target position from a user of the moving body;

a movement control unit configured to execute movement control for moving the moving body to the target position based on the recognition data; and a height control unit configured to execute height control of the moving body in accordance with progress of the movement control.

According to another aspect of the present disclosure, there is provided a control method performed by a control device, the control method including:

acquiring recognition data of an external environment of a moving body;

accepting selection of a target position from a user of the moving body;

executing movement control for moving the moving body to the target position based on the recognition data; and executing height control of the moving body according to progress of the movement control.

According to another aspect of the present disclosure, there is provided a non-transitory computer readable storage medium storing a control program for a control device, the control program being configured to cause a processor of the control device to execute a process including:

acquiring recognition data of an external environment of a moving body;

accepting selection of a target position from a user of the moving body;

executing movement control for moving the moving body to the target position based on the recognition data; and executing height control of the moving body according to progress of the movement control.

According to the present disclosure, it is possible to provide a control device, a control method, and a storage medium storing a control program capable of appropriately adjusting a height of a vehicle when the vehicle moves to a target position under automatic movement control. The present disclosure may contribute to development of a sustainable transportation system, accordingly.

BRIEF DESCRIPTION OF DRAWINGS

FIG. 10 is a flowchart showing a second modification of the entry processing performed by the calculation unit.

DESCRIPTION OF EMBODIMENTS

Figure 1:
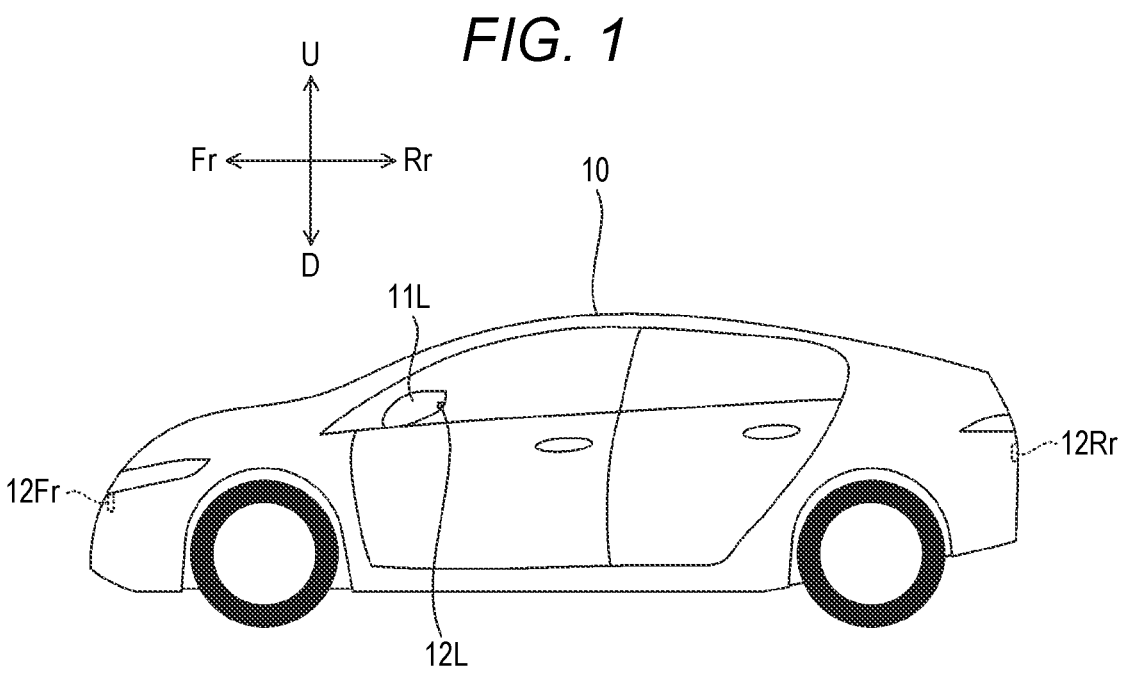
FIG. 1 is a side view showing an example of a vehicle on which a control device according to an embodiment is mounted.

Hereinafter, an embodiment of a control device, a control method, and a control program of the present disclosure will be described with reference to the attached drawings. The drawings are viewed from directions of reference numerals. Further, in the present specification and the like, in order to simplify and clarify the description, a front-rear direction, a left-right direction, and an upper-lower direction are described according to directions viewed from a driver of a vehicle 10 shown in FIGS. 1 and 2. In the drawings, a front side of the vehicle 10 is shown as Fr, a rear side is shown as Rr, a left side is shown as L, a right side is shown as R, an upper side is shown as U, and a lower side is shown as D. (Vehicle 10 on which Control Device is Mounted)

Figure 2:
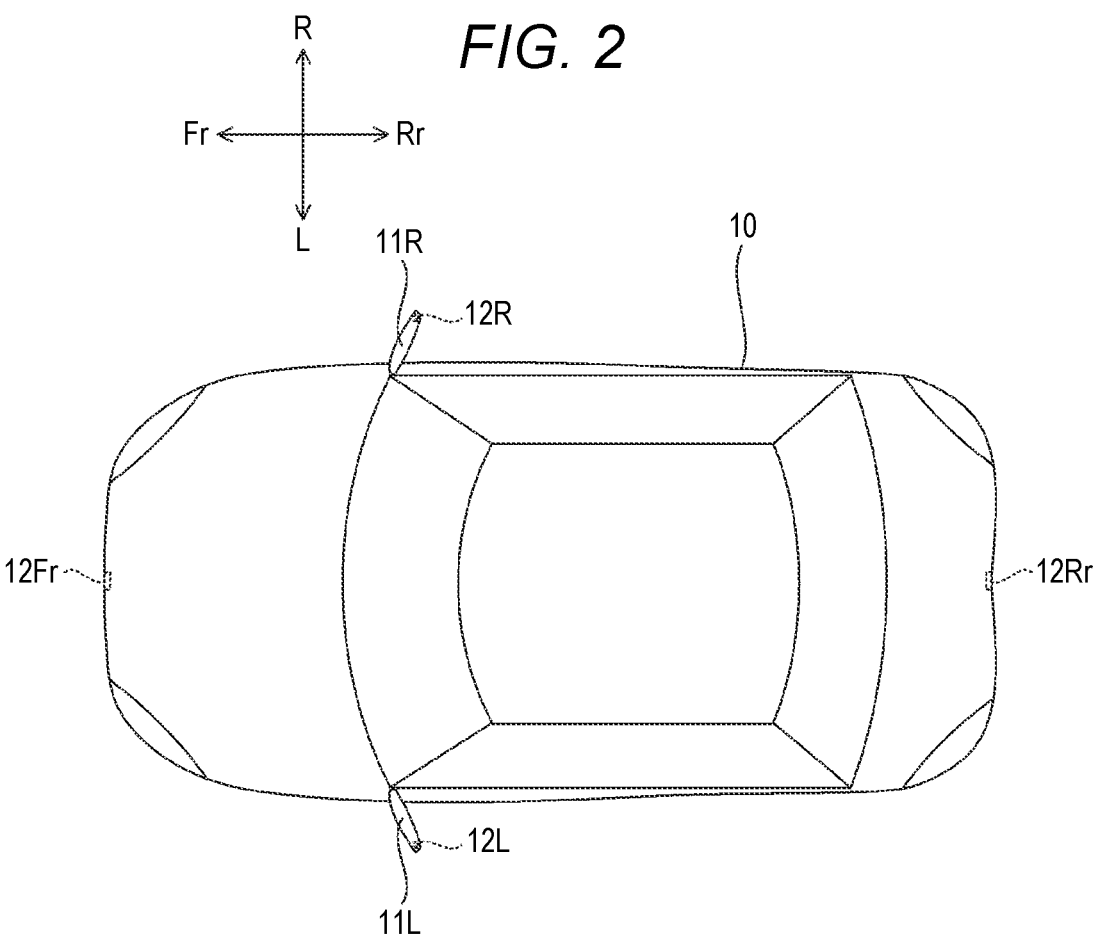
FIG. 2 is a top view of the vehicle shown in FIG. 1.

FIG. 1 is a side view of the vehicle 10 on which the control device of the present disclosure is mounted. FIG. 2 is a top view of the vehicle 10 shown in FIG. 1. The vehicle 10 is an example of a moving body of the present disclosure.

The vehicle 10 is an automobile including a drive source (not shown), and wheels including drive wheels driven by power of the drive source and steerable driven wheels. In the present embodiment, the vehicle 10 is a four-wheeled automobile including a pair of left and right front wheels and a pair of left and right rear wheels. The drive source of the vehicle 10 is, for example, an electric motor. The drive source of the vehicle 10 may be an internal combustion engine such as a gasoline engine or a diesel engine, or may be a combination of an electric motor and an internal combustion engine. The drive source of the vehicle 10 may drive the pair of left and right front wheels, the pair of left and right rear wheels, or the four wheels including the pair of left and right front wheels and the pair of left and right rear wheels. Both the front wheels and the rear wheels may be the steerable driven wheels, or either one of the front wheels and the rear wheels may be the steerable driven wheels.

The vehicle 10 further includes side mirrors 11L and 11R. The side mirrors 11L and 11R are mirrors (back mirrors) that are provided on outer sides of front seat doors of the vehicle 10 and that are for a driver to check a rear side and rear lateral sides. Each of the side mirrors 11L and 11R is fixed to a main body of the vehicle 10 by a rotation shaft that extends in a perpendicular direction, and may be opened and closed by being rotated around the rotation shaft.

The vehicle 10 further includes a front camera 12Fr, a rear camera 12Rr, a left side camera 12L, and a right side camera 12R. The front camera 12Fr is a digital camera that is provided at a front portion of the vehicle 10 and that images the front side of the vehicle 10. The rear camera 12Rr is a digital camera that is provided at a rear portion of the vehicle 10 and that images the rear side of the vehicle 10. The left side camera 12L is a digital camera that is provided at a left side mirror 11L of the vehicle 10 and that images the left side of the vehicle 10. The right side camera 12R is a digital camera that is provided at a right side mirror 11R of the vehicle 10 and that images the right side of the vehicle 10. (Internal Configuration of Vehicle 10)

Figure 3:
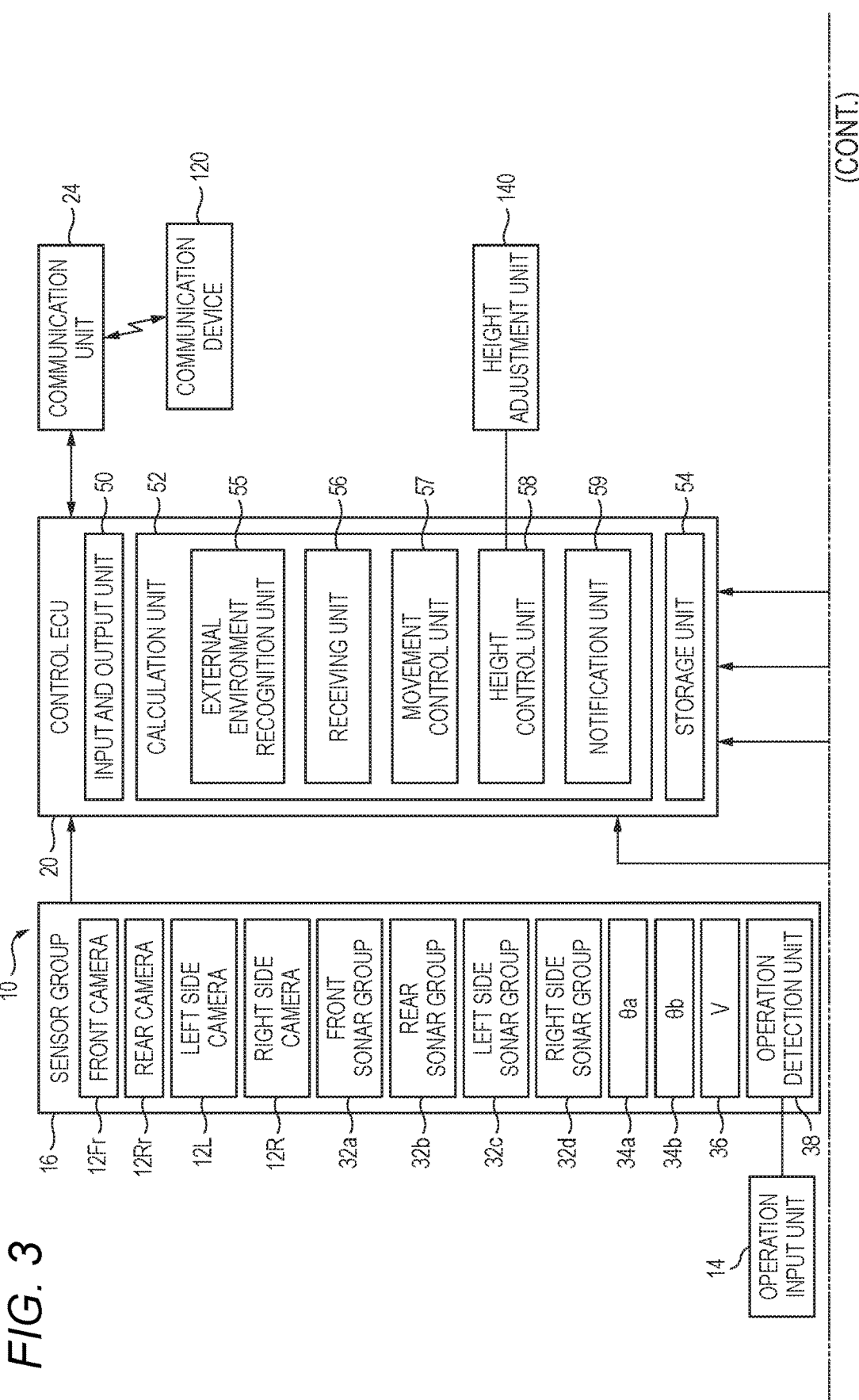
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detection values used for control performed by the control ECU 20. The sensor group 16 includes the front camera 12Fr, the rear camera 12Rr, the left side camera 12L, and the right side camera 12R. Further, the sensor group 16 includes a front sonar group 32a, a rear sonar group 32b, a left side sonar group 32c, and a right side sonar group 32d. Further, the sensor group 16 includes wheel sensors 34a and 34b, a vehicle speed sensor 36, and an operation detection unit 38.

The front camera 12Fr, the rear camera 12Rr, the left side camera 12L, and the right side camera 12R acquire recognition data (for example, a surrounding image) for recognizing external environment of the vehicle 10 by imaging surroundings of the vehicle 10. Surrounding images captured by the front camera 12Fr, the rear camera 12Rr, the left side camera 12L, and the right side camera 12R are referred to as a front image, a rear image, a left side image, and a right side image, respectively. An image constituted by the left side image and the right side image may be referred to as a side image.

The front sonar group 32a, the rear sonar group 32b, the left side sonar group 32c, and the right side sonar group 32d emit sound waves to the surroundings of the vehicle 10, and receive reflected sounds from other objects. The front sonar group 32a includes, for example, four sonars. The sonars that constitute the front sonar group 32a are provided on an obliquely left front side, a front left side, a front right side, and an obliquely right front side of the vehicle 10, respectively. The rear sonar group 32b includes, for example, four sonars. The sonars that constitute the rear sonar group 32b are provided on an obliquely left rear side, a rear left side, a rear right side, and an obliquely right rear side of the vehicle 10, respectively. The left side sonar group 32c includes, for example, two sonars. The sonars that constitute the left side sonar group 32c are provided at a left side front portion and a left side rear portion of the vehicle 10, respectively. The right side sonar group 32d includes, for example, two sonars. The sonars that constitute the right side sonar group 32d are respectively provided at a right side front portion and a right side rear portion of the vehicle 10.

The wheel sensors 34a and 34b detect rotation angles of the wheels of the vehicle 10. The wheel sensors 34a and 34b may be implemented by angle sensors, or may be implemented by displacement sensors. The wheel sensors 34a and 34b output detection pulses every time the wheels are rotated by a predetermined angle. The detection pulses output from the wheel sensors 34a and 34b are used for calculating rotation angles of the wheels and rotation speeds of the wheels. A movement distance of the vehicle 10 is calculated based on the rotation angles of the wheels. The wheel sensor 34a detects, for example, a rotation angle $\theta a$ of the left rear wheel. The wheel sensor 34b detects, for example, a rotation angle $\theta b$ of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a counter shaft of a transmission.

The operation detection unit 38 detects operation content of a user performed using an operation input unit 14, and outputs the detected operation content to the control ECU 20. The operation input unit 14 includes various user interfaces such as a side mirror switch for switching between open and closed states of the side mirrors 11L and 11R, and a shift lever (selector lever or selector).

The navigation device 18 detects a current position of the vehicle 10 by using, for example, a global positioning system (GPS), and guides the user to a path to a destination. The navigation device 18 includes a storage device (not shown) including a map information database.

The navigation device 18 includes a touch panel 42 and a speaker 44. The touch panel 42 functions as an input device and a display device of the control ECU 20. The speaker 44 outputs various kinds of guidance information to the user (passenger) of the vehicle 10 by a sound.

The touch panel 42 is configured to input various commands to the control ECU 20. For example, the user may input a command related to movement assistance of the vehicle 10 via the touch panel 42. The movement assistance includes parking assistance and exit assistance of the vehicle 10. Further, the touch panel 42 is configured to display various screens related to control content of the control ECU 20. For example, a screen related to the movement assistance of the vehicle 10 is displayed on the touch panel 42. Specifically, a parking assistance button for requesting the parking assistance and an exit assistance button for requesting the exit assistance of the vehicle 10 are displayed on the touch panel 42. The parking assistance button includes an automatic parking button for requesting parking by automatic steering of the control ECU 20, and a guidance parking button for requesting guidance during parking by an operation of the driver. The exit assistance button includes an automatic exit button for requesting exiting by the automatic steering of the control ECU 20, and a guidance exit button for requesting guidance during exiting by an operation of the driver. A constituent element other than the touch panel 42, for example, an information terminal such as a smartphone or a tablet terminal may be used as an input device or a display device. In addition, a head-up display (HUD) may be used as a display device.

The control ECU 20 includes an input and output unit 50, a calculation unit 52, and a storage unit 54. The calculation unit 52 is implemented by, for example, a central processing unit (CPU). The calculation unit 52 performs various kinds of control by controlling units based on a program stored in the storage unit 54. Further, the calculation unit 52 inputs and outputs a signal from and to each unit connected to the control ECU 20 via the input and output unit 50. The calculation unit 52 is an example of the control device of the present disclosure.

The calculation unit 52 includes an external environment recognition unit 55 that acquires recognition data of an external environment of the vehicle 10, a reception unit 56 that receives selection of a target position from the user, a movement control unit 57 that executes movement control for moving the vehicle 10 to the selected target position, a height control unit 58 that executes height control of the vehicle 10, and a notification unit 59 that notifies the user of a message.

The external environment recognition unit 55 acquires surrounding images (recognition data of the external environment) of the vehicle 10 captured by the front camera 12Fr, the rear camera 12Rr, the left side camera 12L, and the right side camera 12R from the cameras. The external environment recognition unit 55 may also acquire recognition data of the external environment of the vehicle 10 acquired by the sonar groups 32a to 32d or the radar.

The reception unit 56 receives an instruction signal for instructing movement of the vehicle 10 input from the user via the touch panel 42 of the navigation device 18 or the smartphone. For example, when a predetermined target position for entry/exit is designated by selection of the user from candidates for the target position at which the vehicle 10 enters/exits displayed on the touch panel 42, the reception unit 56 receives a signal output from the touch panel 42 by the designation as an instruction signal for allowing the vehicle 10 to enter/exit.

The movement control unit 57 performs the movement assistance of the vehicle 10 by the automatic steering for automatically operating a steering 110 under control of the movement control unit 57. The movement assistance of the vehicle 10 includes automatic entry assistance for assisting automatic entry of the vehicle 10 and automatic exit assistance for assisting automatic exit of the vehicle 10. In the assistance control of the automatic steering, an accelerator pedal (not shown), a brake pedal (not shown), and the operation input unit 14 are automatically operated. Further, the movement control unit 57 performs guidance entry assistance and guidance exit assistance when the vehicle 10 is manually caused to entry and exit a parking space by the user's operation on the accelerator pedal, the brake pedal, and the operation input unit 14.

For example, the movement control unit 57 performs automatic entry control for allowing the vehicle 10 to enter a designated predetermined target position and automatic exit control for allowing the vehicle 10 to exit the designated predetermined target position based on the recognition data of the external environment of the vehicle 10 acquired by the front camera 12Fr, the rear camera 12Rr, the left side camera 12L, and the right side camera 12R and the predetermined parking position designated by the user. The predetermined target position includes a normal vacant parking space in which the vehicle 10 may be parked and a registered parking space (registered target position) registered in the storage unit 54. The registered target position is a specific target position for the user, for example, a parking position where the user frequently parks the vehicle 10. The registered target position includes, for example, a monthly parking lot, a home parking lot, and a coin-operated parking lot with high parking frequency. The registered target position is detected by comparing feature points of the target position acquired from sensing data of the camera, the sonar, and the radar.

A height adjustment unit 140 capable of adjusting a height of the vehicle 10 is connected to the height control unit 58. The height adjustment unit 140 is constituted by, for example, an air suspension, a hydraulic suspension, or the like. The height control unit 58 outputs a height control signal for controlling the height of the vehicle 10 to the height adjustment unit 140. The height adjustment unit 140 adjusts the height of the vehicle 10 based on the height control signal.

The height control unit 58 executes height control for controlling the height of the vehicle 10 in accordance with the progress of movement control for moving the vehicle 10 to the target position. The height of the vehicle 10 includes a height of an uppermost portion of the vehicle 10 and a height of a lowermost portion of the vehicle 10. The lowermost portion of the vehicle 10 refers to a minimum ground clearance (vehicle height) of the vehicle 10 excluding a ground contact portion such as tires.

For example, the height control unit 58 starts the height control for controlling the height of the vehicle 10 in response to the movement control for moving the vehicle 10 to the target position or the completion of the movement control for moving the vehicle 10 from the target position is completed. The completion of the movement control includes, for example, a period immediately before the completion of the movement control in a state in which the vehicle 10 moving due to the movement control moves little, in addition to the time when the movement control is completed. The movement control for moving the vehicle 10 to the target position is automatic entry assistance control by the movement control unit 57. The movement control for moving the vehicle 10 from the target position is automatic exit assistance control by the movement control unit 57.

The height control unit 58 determines whether the height control is possible during the execution of the movement control for moving the vehicle 10 to the target position or the movement control for moving the vehicle 10 from the target position, and starts the height control for controlling the height of the vehicle 10 according to a determination result.

Whether the height control is possible means whether the height control from a height of the vehicle 10 suitable for moving the vehicle 10 to the target position to a height of the vehicle 10 suitable for the user to get on and off the vehicle 10 is possible during the movement control for moving the vehicle 10 to the target position, for example. Whether the height control is possible means whether the height control from a height of the vehicle 10 suitable for moving the vehicle 10 from the target position to a height of the vehicle 10 suitable for normal traveling of the vehicle 10 is possible during the movement control for moving the vehicle 10 from the target position.

During the execution of the movement control for moving the vehicle 10 to the target position, the height control unit 58 starts the height control for controlling the height of the vehicle 10 in accordance with an acquisition state of the recognition data of the external environment of the vehicle 10 acquired by the front camera 12Fr, the rear camera 12Rr, the left side camera 12L, and the right side camera 12R. For example, the height control unit 58 starts the height control when it is possible to acquire the recognition data of the external environment to the extent that the movement control of the vehicle 10 may be completed, that is, it is possible to acquire the sensing data to the extent that the movement control may be performed by odometry thereafter, and it is possible to perform self-position estimation of estimating a current relative position of the vehicle 10 with respect to the target position. When the height control of the vehicle 10 is performed during the movement, an error may occur in the sensing of the camera. However, as long as the acquisition of the sensing data is completed and the self-position estimation is possible, the movement control may be performed by odometry thereafter, and thus the height control may be performed even during the movement of the vehicle 10.

The height control unit 58 executes first height control for controlling the height of the vehicle 10 based on the recognition data of the external environment of the vehicle 10 before starting the movement control for moving the vehicle 10 to the target position, and starts second height control for controlling the vehicle 10 to a height different from the height under the first height control in response to the completion of the movement control or during the execution of the movement control. The first height control is height control of the vehicle 10 to a height at which the movement control of the vehicle 10 to a target position is possible. For example, the first height control is control to a height at which safe movement control may be performed in consideration of a state of a road surface such as a speed bump (for example, a bump on a road of a parking lot for speed reduction) in the parking lot, a height of a ceiling of the parking lot, and a recognition result of other obstacles. The second height control is height control of the vehicle 10 to a height more suitable for the user of the vehicle 10 to get on and off than the height at which the movement control of the vehicle 10 to the target position is possible. The height suitable for the user to get on and off may be a height determined in advance according to the vehicle type or may be a height set in advance by the user. The height of the speed bump, the height of the ceiling, and the like are detected by image analysis of the recognition data of the external environment acquired by a camera or the like.

The height control unit 58 stores the height of the vehicle 10 before starting the first height control when the movement control (automatic exit assistance control) for moving the vehicle 10 from the target position is executed, and executes the height control of the vehicle 10 to the stored height in response to the completion of the movement control for moving the vehicle 10 from the target position. The height of the vehicle 10 before starting the first height control is the height of the vehicle 10 when the vehicle 10 normally travels.

The height control unit 58 acquires type information indicating the type of the vehicle 10 from the storage unit 54, and executes height control (first height control, second height control, and the like) of the vehicle 10 according to each state based on the type information. The storage unit 54 stores height information related to a plurality of types of vehicles. Accordingly, since the height may be controlled according to the type of the vehicle 10, the same control device may be applied to a plurality of types of vehicles 10 (may be used on multiple occasions).

The height control unit 58 continues the height control even when the user gets off the vehicle 10 before the completion of the height control for controlling the height of the vehicle 10 suitable for the user to get on and off the vehicle 10. By continuing and completing the height control even when the user gets off the vehicle 10, the height of the vehicle 10 may be kept to a height suitable for getting on and off when the user gets on the vehicle 10 next time.

For example, in a case where the height control for controlling the height of the vehicle 10 suitable for the user to get on and off the vehicle 10 is completed after the movement control of the vehicle 10 to the target position is completed, the notification unit 59 notifies the user of a message in response to the completion of the height control. The message to the user is, for example, a message such as "You can get off" for notifying that it is possible to get on and off the vehicle 10. For example, in a case where height control for controlling the height of the vehicle 10 suitable for the user to get on and off the vehicle 10 is completed after the movement control of the vehicle 10 to the target position is completed, the notification unit 59 notifies the user of the message in response to the completion of the movement control of the vehicle 10. The message to the user is, for example, a message such as "You can get off the vehicle. Please be careful as the height is being adjusted" for notifying (calling attention) that it is possible to get on and off the vehicle 10 but the height of the vehicle 10 is being adjusted.

For example, the "parking" is a stop as an occupant gets on and off the vehicle, and excludes a temporary stop due to a traffic signal or the like. The "target position" is a parking position at which the moving body is parked. Further, the "parking position" is a position where the moving body is stopped, that is, a position where the moving body is parked.

The EPS system 22 includes a steering angle sensor 100, a torque sensor 102, an EPS motor 104, a resolver 106, and an EPS ECU 108. The steering angle sensor 100 detects a steering angle $\theta$st of the steering 110. The torque sensor 102 detects a torque TQ applied to the steering 110.

The EPS motor 104 applies a driving force or a reaction force to a steering column 112 coupled to the steering 110, thereby enabling the occupant to perform operation assistance of the steering 110 and automatic steering during the parking assistance. The resolver 106 detects a rotation angle $\theta$m of the EPS motor 104. The EPS ECU 108 controls the entire EPS system 22. The EPS ECU 108 includes an input and output unit (not shown), a calculation unit (not shown), and a storage unit (not shown).

The communication unit 24 may perform wireless communication with another communication device 120. The other communication device 120 is a base station, a communication device of another vehicle, an information terminal such as a smartphone carried by the passenger of the vehicle 10, or the like.

The driving force control system 26 includes a driving ECU 130. The driving force control system 26 executes driving force control of the vehicle 10. The driving ECU 130 controls a driving force of the vehicle 10 by controlling an engine or the like (not shown) based on an operation performed by the user on the accelerator pedal (not shown).

The braking force control system 28 includes a braking ECU 132. The braking force control system 28 executes braking force control of the vehicle 10. The braking ECU 132 controls a braking force of the vehicle 10 by controlling a braking mechanism or the like (not shown) based on an operation performed by the user on the brake pedal (not shown).

Processing of Control Device (Calculation Unit 52) at the Time of Entry

Figure 4:
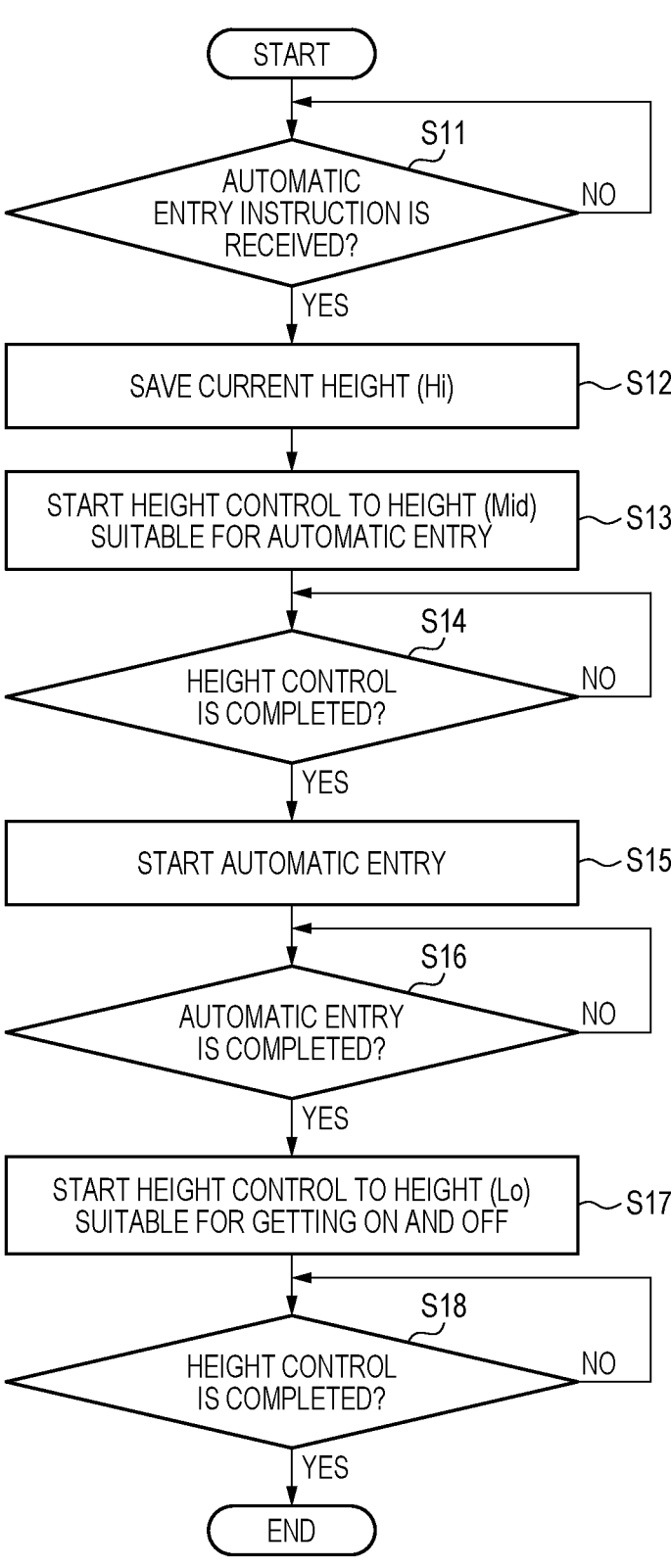
FIG. 4 is a flowchart showing an example of entry processing performed by a calculation unit.

Next, entry processing of the calculation unit 52 of the vehicle 10 at the time of automatic entry will be described. FIG. 4 is a flowchart showing an example of the entry processing performed by the calculation unit 52. Upon receiving an entry start operation from the user, the calculation unit 52 starts the processing shown in FIG. 4. The entry start operation is, for example, an operation of designating a predetermined parking position (target position) at which the vehicle 10 is parked and then touching an automatic entry button in the image of the parking lot displayed on the touch panel 42. The entry start operation is performed, for example, when the vehicle 10 arrives near a parking lot where the vehicle 10 is parked.

First, the reception unit 56 of the calculation unit 52 determines whether an automatic entry instruction for starting automatic entry of the vehicle 10 is received (step S11). The automatic entry instruction is, for example, the entry start operation.

In step S11, in a case where the automatic entry instruction is not received (step S11: No), the reception unit 56 repeats the processing in step S11. In step S11, in a case where the automatic entry instruction is received (step S11: Yes), the height control unit 58 of the calculation unit 52 stores a current height (Hi) of the vehicle 10 in the storage unit 54 (step S12). The current height (Hi) is the height of the vehicle 10 before the automatic entry is started, that is, the height of the vehicle 10 when the vehicle 10 normally travels. The height (Hi) will be further described later with reference to FIG. 8.

Next, the height control unit 58 starts height control for controlling the height of the vehicle 10 so that the height of the vehicle 10 becomes a height (Mid) suitable for the automatic entry when the vehicle 10 automatically enters the designated target position (step S13). The height (Mid) suitable for the automatic entry is, for example, a height at which the lowermost portion of the vehicle 10 does not contact the speed bump in the parking lot and a height at which the uppermost portion of the vehicle 10 does not contact the ceiling of the parking place when the vehicle 10 enters the parking lot. The height (Mid) will be further described later with reference to FIG. 8.

Next, the height control unit 58 determines whether the height control of the vehicle 10 started in step S13 is completed (step S14).

In step S14, in a case where the height control of the vehicle 10 is not completed (step S14: No), the height control unit 58 repeats the processing in step S14 until the height control is completed. In step S14, in a case where the height control of the vehicle 10 is completed (step S14: Yes), the movement control unit 57 of the calculation unit 52 starts the automatic entry control for allowing the vehicle 10 to automatically enter the target position (step S15). Next, the movement control unit 57 determines whether the automatic entry of the vehicle 10 started in step S15 is completed (step S16).

In step S16, in a case where the automatic entry of the vehicle 10 is not completed (step S16: No), the movement control unit 57 repeats the processing in step S16 until the automatic entry is completed. In step S16, in a case where the automatic entry of the vehicle 10 is completed (step S16: Yes), the height control unit 58 starts the height control for controlling the height of the vehicle 10 so that the height of the vehicle 10 becomes a height (Lo) suitable for the user to get on and off the vehicle 10 (step S17). The height (Lo) will be further described later with reference to FIG. 8.

Next, the height control unit 58 determines whether the height control of the vehicle 10 started in step S17 is completed (step S18).

In step S18, in a case where the height control of the vehicle 10 is not completed (step S18: No), the height control unit 58 repeats the processing in step S18 until the height control is completed. In step S18, if the height control of the vehicle 10 is completed (step S18: Yes), the height control unit 58 ends the entry processing.

As described above, in the entry processing of allowing the vehicle 10 to automatically enter the target position such as a parking place, the height control unit 58 of the calculation unit 52 (control device) controls the height of the vehicle 10 to the height (Mid) suitable for the automatic entry at the time of the automatic entry and controls the height of the vehicle 10 to the height (Lo) suitable for the user to get on and off in response to the completion of the automatic entry. Therefore, the height of the vehicle 10 may be controlled to an appropriate height according to an entry state of the vehicle 10. Accordingly, for example, the convenience of getting on and off the vehicle 10 for the user may be improved.

( ) Processing of Control Device (Calculation Unit 52) at the Time of Exit)

Figure 5:
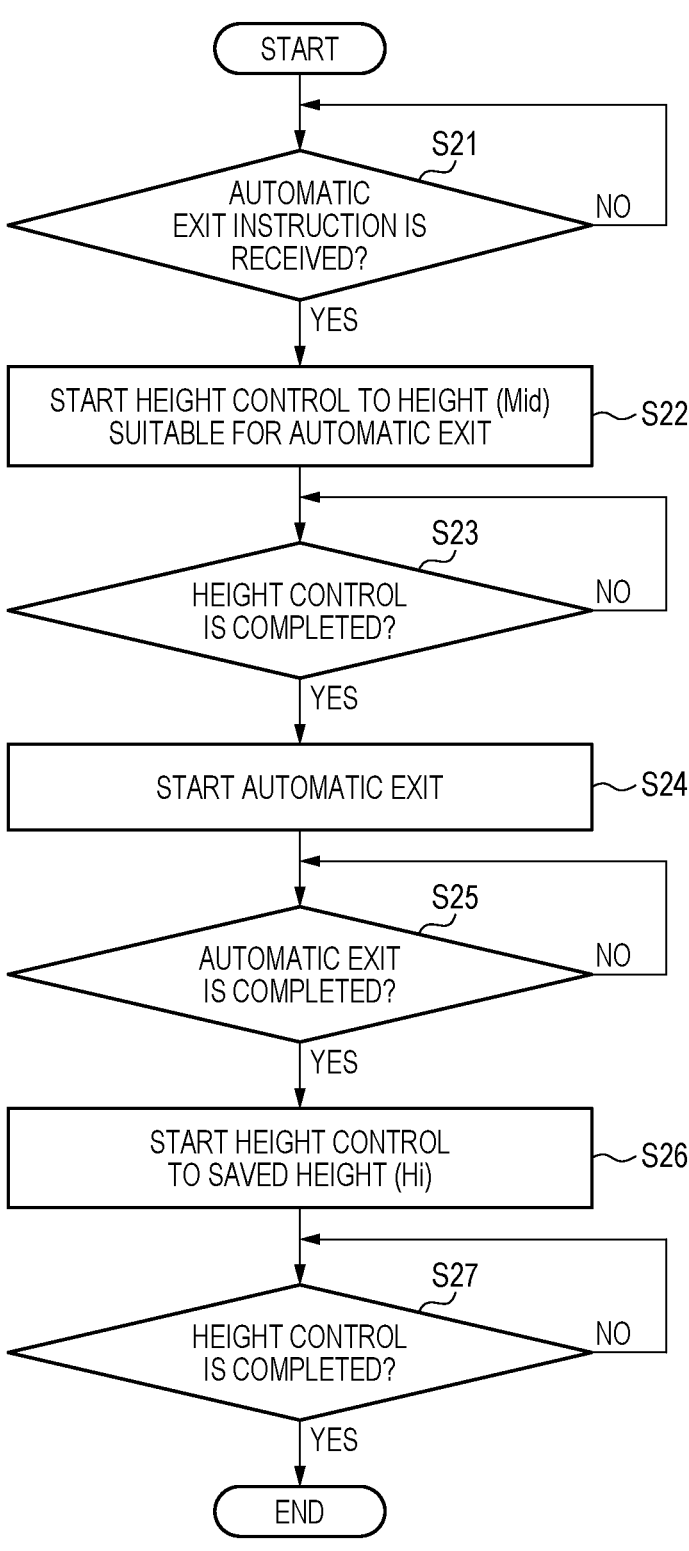
FIG. 5 is a flowchart showing an example of exit processing performed by the calculation unit.

Next, exit processing of the calculation unit 52 of the vehicle 10 at the time of automatic exit will be described. FIG. 5 is a flowchart showing an example of the exit processing performed by the calculation unit 52. Upon receiving an exit start operation from the user, the calculation unit 52 starts the processing shown in FIG. 5. The exit start operation is performed, for example, when the vehicle 10 automatically exits the parking position where the vehicle 10 is parked. The exit start operation is, for example, an operation of designating a direction in which the vehicle 10 exits from the target position where the vehicle 10 has entered the parking space, for example, a left front/right front direction, a left rear/right rear direction, or the like, and then touching an automatic exit button in the image of the parking lot displayed on the touch panel 42.

First, the reception unit 56 determines whether an automatic exit instruction for starting automatic exit of the vehicle 10 is received (step S21). The automatic exit instruction is, for example, the exit start operation.

In step S21, in a case where the automatic exit instruction is not received (step S21: No), the reception unit 56 repeats the processing in step S21. In step S21, in a case where the automatic exit instruction is received (step S21: Yes), the height control unit 58 starts the height control for controlling the height of the vehicle 10 so that the height of the vehicle 10 becomes a height (Mid) suitable for the automatic exit when the vehicle 10 automatically exits from the designated target position (step S22). The height (Mid) suitable for the automatic exit is, for example, a height at which the lowermost portion of the vehicle 10 does not contact the speed bump in the parking lot and a height at which the uppermost portion of the vehicle 10 does not contact the ceiling of the parking place when the vehicle 10 exits the parking lot. The height (Mid) will be further described later with reference to FIG. 9.

Next, the height control unit 58 determines whether the height control of the vehicle 10 started in step S22 is completed (step S23).

In step S23, in a case where the height control of the vehicle 10 is not completed (step S23: No), the height control unit 58 repeats the processing in step S23 until the height control is completed. In step S23, in a case where the height control of the vehicle 10 is completed (step S23: Yes), the movement control unit 57 starts the automatic exit control for allowing the vehicle 10 to automatically exit from the target position (step S24).

Next, the movement control unit 57 determines whether the automatic exit of the vehicle 10 started in step S24 is completed (step S25).

In step S25, in a case where the automatic exit of the vehicle 10 is not completed (step S25: No), the movement control unit 57 repeats the processing in step S25 until the automatic exit is completed. In step S25, in a case where the automatic exit of the vehicle 10 is completed (step S25: Yes), the height control unit 58 starts the height control for controlling the height of the vehicle 10 so that the height of the vehicle 10 becomes a height (Hi) of the vehicle 10 stored in the storage unit 54 when the vehicle 10 enters the target position (step S26). The height (Hi) will be further described later with reference to FIG. 9.

Next, the height control unit 58 determines whether the height control of the vehicle 10 started in step S26 is completed (step S27).

In step S27, in a case where the height control of the vehicle 10 is not completed (step S27: No), the height control unit 58 repeats the processing in step S27 until the height control is completed. In step S27, in a case where the height control of the vehicle 10 is completed (step S27: Yes), the height control unit 58 ends the entry processing. Since the automatic exit of the vehicle 10 is completed, the user may start the travel of the vehicle 10 without waiting for the completion of the height control of the vehicle 10.

As described above, in the exit processing of allowing the vehicle 10 to automatically exit from the target position such as a parking place, the height control unit 58 of the calculation unit 52 (control device) controls the height of the vehicle 10 to the height (Mid) suitable for the automatic exit at the time of the automatic exit, and controls, in response to the completion of the automatic exit, the height of the vehicle 10 to the height (Hi) of the vehicle 10 at the time of the normal traveling stored in the storage unit 54 when the vehicle 10 enters the parking place. Therefore, the height of the vehicle 10 may be controlled to an appropriate height according to an exit state of the vehicle 10. Accordingly, for example, since the height is automatically returned to the original height (Hi) at the completion of the automatic exit, the user does not need to issue an instruction for the height adjustment, and the convenience may be improved.

(First Modification of Processing of Calculation Unit 52 at the Time of Entry)

Figure 6:
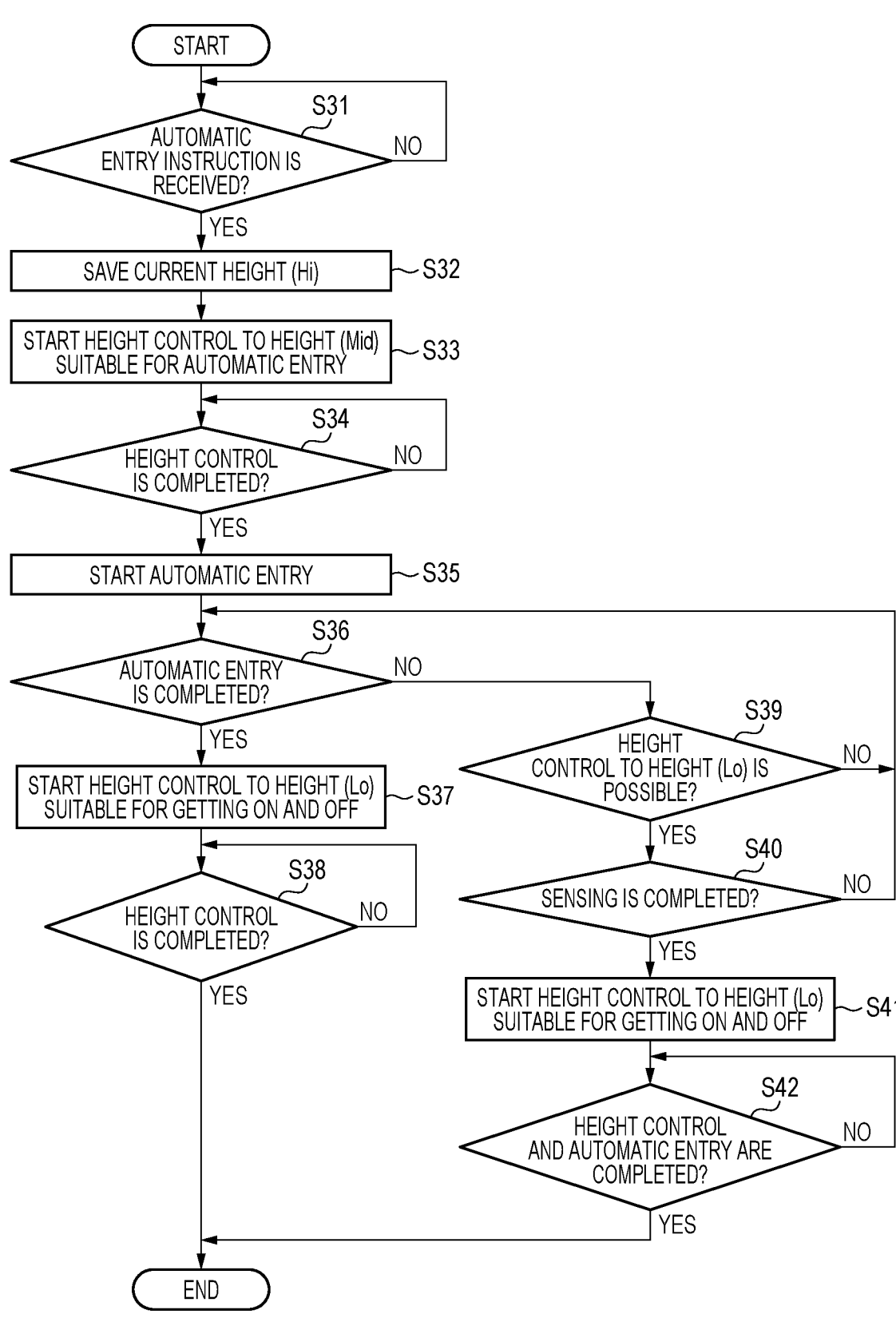
FIG. 6 is a flowchart showing a first modification of the entry processing performed by the calculation unit.

Next, a first modification of the entry processing of the calculation unit 52 of the vehicle 10 at the time of the automatic entry will be described. FIG. 6 is a flowchart showing a first modification of the entry processing performed by the calculation unit 52. Upon receiving the entry start operation from the user, the calculation unit 52 starts the processing shown in FIG. 6 as in the entry processing in FIG. 4.

As shown in FIG. 6, in the first modification of the entry processing, processing from step S31 to step S38 are the same as processing from step S11 to step S18 in the entry processing described in FIG. 4. Therefore, the description of steps S31 to S38 will be omitted.

In the first modification of the entry processing, in a case where the automatic entry of the vehicle 10 is not completed in step S36 (step S36: No), the height control unit 58 determines whether it is possible to perform the height control for controlling the height of the vehicle 10 so that the height of the vehicle 10 becomes a height (Lo) suitable for getting on and off when the user gets on and off the vehicle 10 (step S39). Whether the vehicle 10 is allowed to be controlled to the height (Lo) means that even when the height of the vehicle 10 is changed to the height (Lo), the vehicle 10 may enter the parking space without contacting the speed bump, that is, the vehicle 10 passes through a position of the speed bump existing in an entry path to the target position. The height (Lo) is the same as the height (Lo) in the entry processing described in FIG. 4.

In step S39, in a case where the height control to the height (Lo) is not possible (step S39: No), the movement control unit 57 returns to step S36 and repeats each processing. In step S39, in a case where the height control to the height (Lo) is possible (step S39: Yes), the movement control unit 57 determines whether the sensing is completed (step S40). The state in which the sensing is completed means a state in which the recognition data of the external environment may be acquired to the extent that the automatic entry control may be completed by odometry, and a self-position of the vehicle 10 may be estimated with respect to the target position.

In step S40, in a case where the sensing is not completed (step S40: No), the movement control unit 57 returns to step S36 and repeats each processing. In step S40, in a case where the sensing is completed (step S40: Yes), the height control unit 58 starts the height control for controlling the height of the vehicle 10 so that, when the user gets on and off the vehicle 10, the height of the vehicle 10 becomes a height (Lo) suitable for the getting on and off (step S41).

Next, the height control unit 58 determines whether the height control of the vehicle 10 started in step S41 is completed, and the movement control unit 57 determines whether the automatic entry of the vehicle 10 started in step S35 is completed (step S42).

In step S42, in a case where at least one of the height control of the vehicle 10 and the automatic entry control of the vehicle 10 is not completed (step S42: No), the height control unit 58 and the movement control unit 57 repeat the processing in step S42 until the control is completed. In step S42, in a case where the height control of the vehicle 10 and the automatic entry control of the vehicle 10 are completed (step S42: Yes), the calculation unit 52 ends the entry processing. Either of the height control and the automatic entry control may be performed first.

As described above, according to the first modification of the entry processing, the height control unit 58 controls the height of the vehicle 10 to the height (Lo) suitable for the user to get on and off when it is determined that the height control of the vehicle 10 is possible even during the control of the automatic entry of the vehicle 10 and it is determined that the sensing of the automatic entry is completed. Therefore, the height control of the vehicle 10 may be started before the entry to the target position is completed, and completion waiting time of the height (Lo) control after the entry to the target position is completed may be reduced, thereby improving the convenience.

(Modification of Processing of the Calculation Unit 52 at the Time of Exit)

Figure 7:
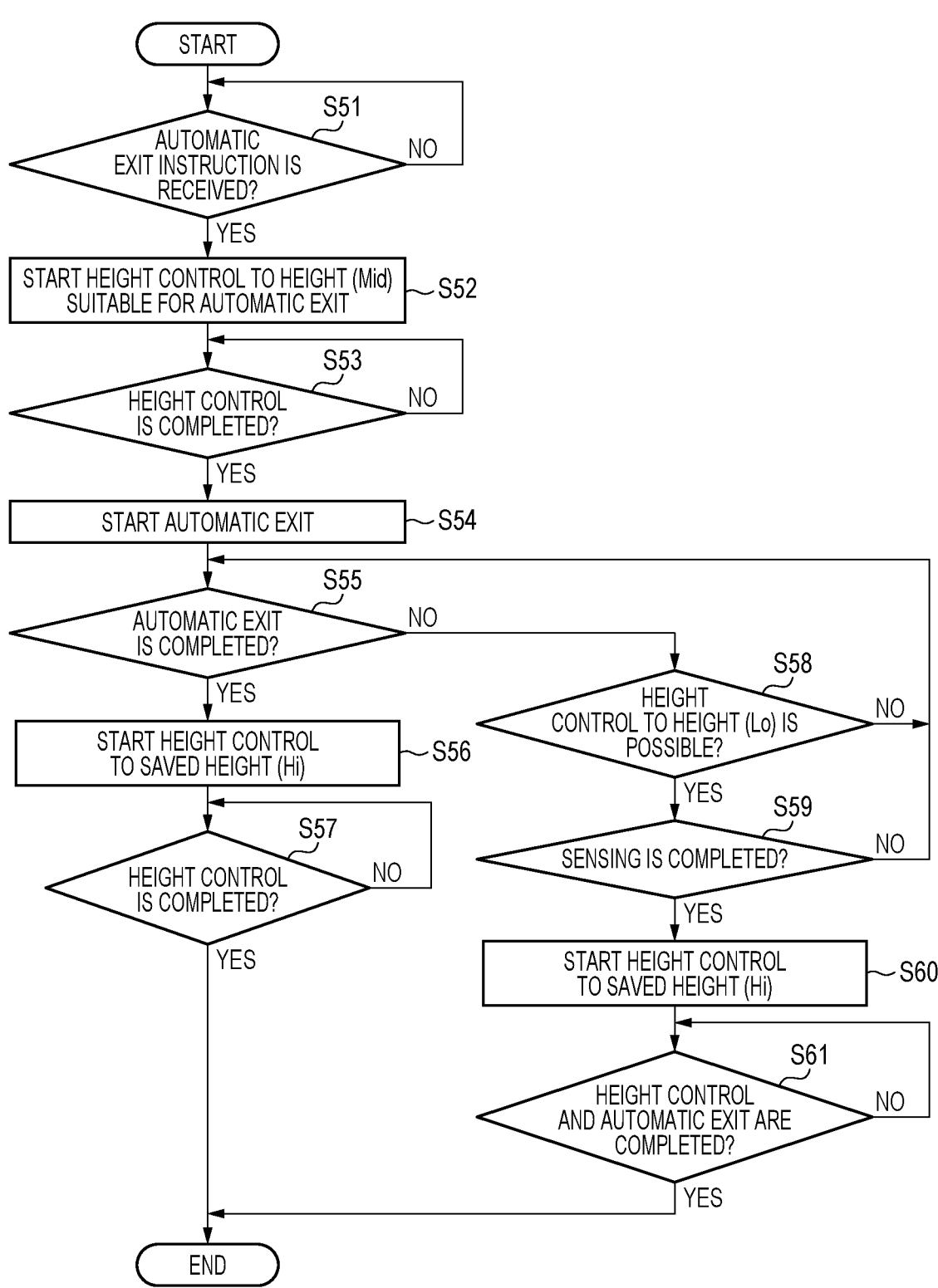
FIG. 7 is a flowchart showing a modification of the exit processing performed by the calculation unit.

Next, a modification of the exit processing of the calculation unit 52 at the time of the automatic exit of the vehicle 10 will be described. FIG. 7 is a flowchart showing a modification of the exit processing performed by the calculation unit 52. Upon receiving the exit start operation from the user, the calculation unit 52 starts the processing shown in FIG. 7 as in the exit processing in FIG. 5.

As shown in FIG. 7, in the modification of the exit processing, processing from step S51 to step S57 are the same as processing from step S21 to step S27 in the exit processing described in FIG. 5. Therefore, the description of steps S51 to S57 will be omitted.

In the modification of the exit processing, in a case where the automatic exit of the vehicle 10 is not completed in step S55 (step S55: No), the height control unit 58 determines whether it is possible to perform the height control for controlling the height of the vehicle 10 so that the height of the vehicle 10 becomes a height (Hi) when the vehicle 10 normally travels (step S58). Whether it is possible to perform the height control for controlling the height of the vehicle 10 to the height (Hi) means that the vehicle 10 may exit the parking place without contacting the ceiling even when the height of the vehicle 10 is changed to the height (Hi), that is, the vehicle 10 has left a position where the ceiling of the parking place exists. The height (Hi) is the same as the height (Hi) in the exit processing described in FIG. 5.

In step S58, in a case where the height control to the height (Hi) is not possible (step S58: No), the movement control unit 57 returns to step S55 and repeats each processing. In step S58, in a case where the height control to the height (Hi) is possible (step S58: Yes), the movement control unit 57 determines whether the sensing is completed (step S59). The state in which the sensing is completed means a state in which the recognition data of the external environment may be acquired to the extent that the automatic exit control may be completed by odometry, and a self-position of the vehicle 10 may be estimated with respect to a stop position of an exit destination.

In step S59, in a case where the sensing is not completed (Step S59: No), the movement control unit 57 returns to step S55 and repeats each processing. In step S59, in a case where the sensing is completed (step S59: Yes), the height control unit 58 starts the height control for controlling the height of the vehicle 10 so that the height of the vehicle 10 becomes a height (Hi) of the vehicle 10 stored in the storage unit 54 when the vehicle 10 enters the target position (step S60).

Next, the height control unit 58 determines whether the height control of the vehicle 10 started in step S60 is completed, and the movement control unit 57 determines whether the automatic exit of the vehicle 10 started in step S54 is completed (step S61).

In step S61, in a case where at least one of the height control of the vehicle 10 and the automatic exit control of the vehicle 10 is not completed (step S61: No), the height control unit 58 and the movement control unit 57 repeat the processing in step S61 until the control is completed. In step S61, in a case where the height control of the vehicle 10 and the automatic exit control of the vehicle 10 are completed (step S61: Yes), the calculation unit 52 ends the entry processing.

As described above, according to the modification of the exit processing, the height control unit 58 controls the height of the vehicle 10 to the height (Hi) during the normal traveling in a case where it is determined that the height control of the vehicle 10 is possible even during the control of the automatic exit of the vehicle 10 and in a case where it is further determined that the sensing of the automatic exit is completed. Therefore, it is possible to start the height control of the vehicle 10 before the exit from the target position is completed, and completion waiting time of the height (Hi) control after the exit from the target position is completed may be reduced, thereby improving the convenience.

Height Control of Vehicle 10 at the Time of Entry

Next, an example of the height control of the vehicle 10 at the time of automatic entry will be described with reference to FIG. 8.

Figure 8:
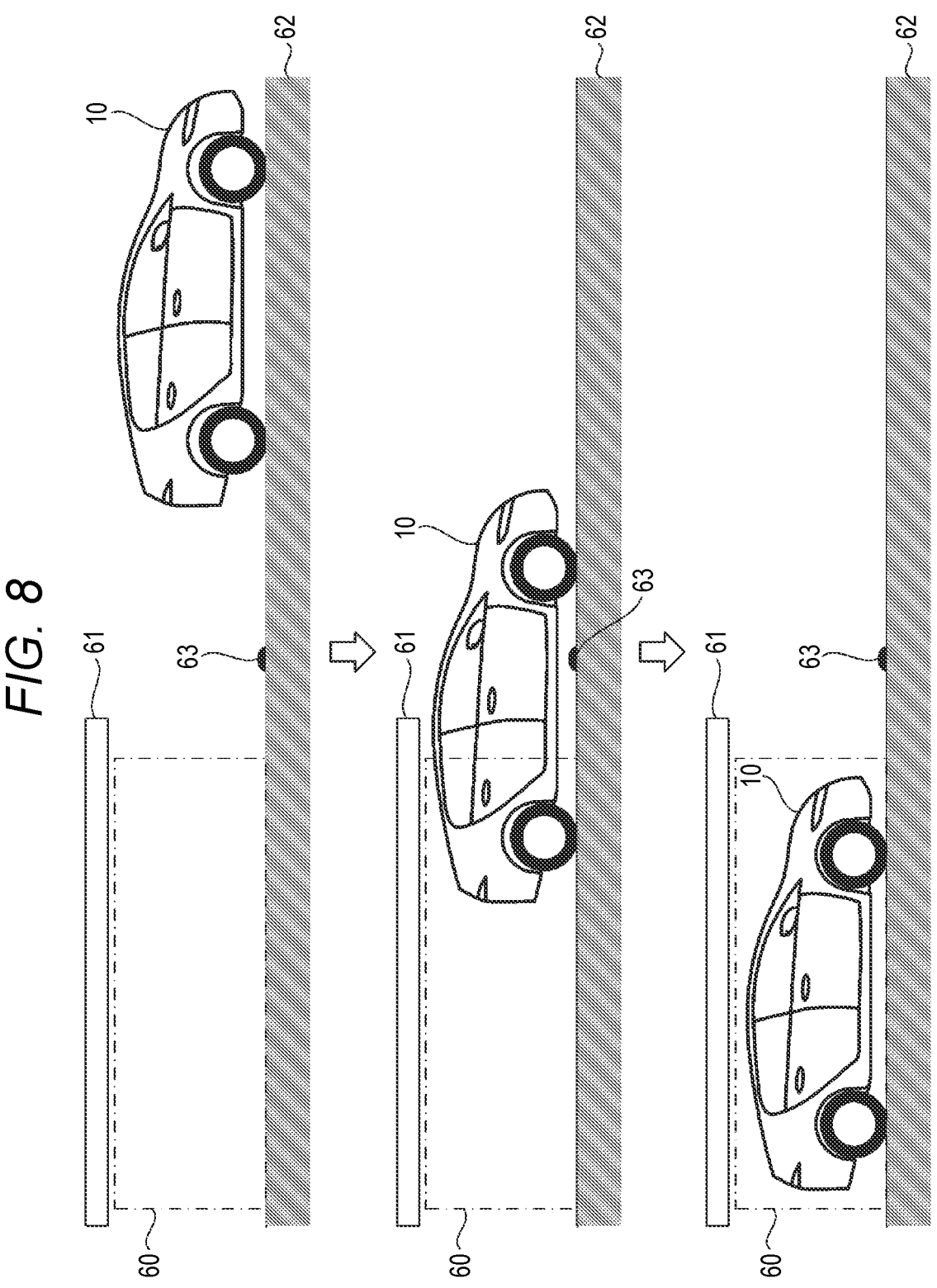
FIG. 8 shows an example of vehicle height control at the time of automatic entry.

The upper diagram in FIG. 8 is a diagram showing a state before the automatic entry of the vehicle 10 to a designated target position 60 is started. For example, it is assumed that the vehicle 10 ends normal traveling on a general road and arrives at a parking lot. When the vehicle 10 receives the automatic entry instruction for starting the automatic entry, the height (Hi), which is the height of the vehicle 10 adjusted during normal traveling of the vehicle 10, is stored in the storage unit 54. This corresponds to, for example, the processing from step S11 to step S12 in the entry processing described in FIG. 4 and the processing from step S31 to step S32 in the entry processing of the first modification described in FIG. 6.

The middle diagram in FIG. 8 is a diagram showing a state in which the vehicle 10 is in the process of automatically entering the specified target position 60. After saving the height (Hi) in the storage unit 54, the vehicle 10 adjusts the height of the vehicle 10 to a height (Mid) suitable for automatic entry in consideration of a ceiling 61 of the target position 60 and a speed bump 63 provided in a traveling area 62 to the target position 60, and starts the automatic entry when the adjustment of the height (Mid) is completed. This corresponds to, for example, the processing from step S13 to step S15 in the entry processing described in FIG. 4 and the processing from step S33 to step S35 in the entry processing of the first modification described in FIG. 6.

The lower diagram in FIG. 8 is a diagram showing a state in which the automatic entry of the vehicle 10 to the designated target position 60 is completed. When the automatic entry is completed, the vehicle 10 adjusts the height of the vehicle 10 to a height (Lo) suitable for the user to get on and off the vehicle 10. Since the automatic entry is completed, the height (Lo) is a height suitable for the user to get on and off regardless of (without need of consideration of) a height of the speed bump 63. This corresponds to, for example, the processing from step S16 to step S18 in the entry processing described in FIG. 4 and the processing from step S36 to step S38 in the entry processing of the first modification described in FIG. 6.

In the example shown in the lower part of FIG. 8, the height of the vehicle 10 is adjusted to the height (Lo) after the vehicle 10 reaches the target position 60. However, for example, even before the vehicle 10 reaches the target position 60, when it is confirmed that the vehicle 10 has passed the position of the speed bump 63 and there is no obstacle such as a speed bump on the traveling area 62 of the vehicle 10 thereafter, the adjustment of changing the height of the vehicle 10 to the height (Lo) may be started. This corresponds to, for example, the processing from step S39 to step S42 in the entry processing of the first modification described in FIG. 6.

(Height Control of Vehicle 10 at the Time of Exit)

Next, an example of the height control of the vehicle 10 at the time of automatic exit will be described with reference to FIG. 9.

Figure 9:
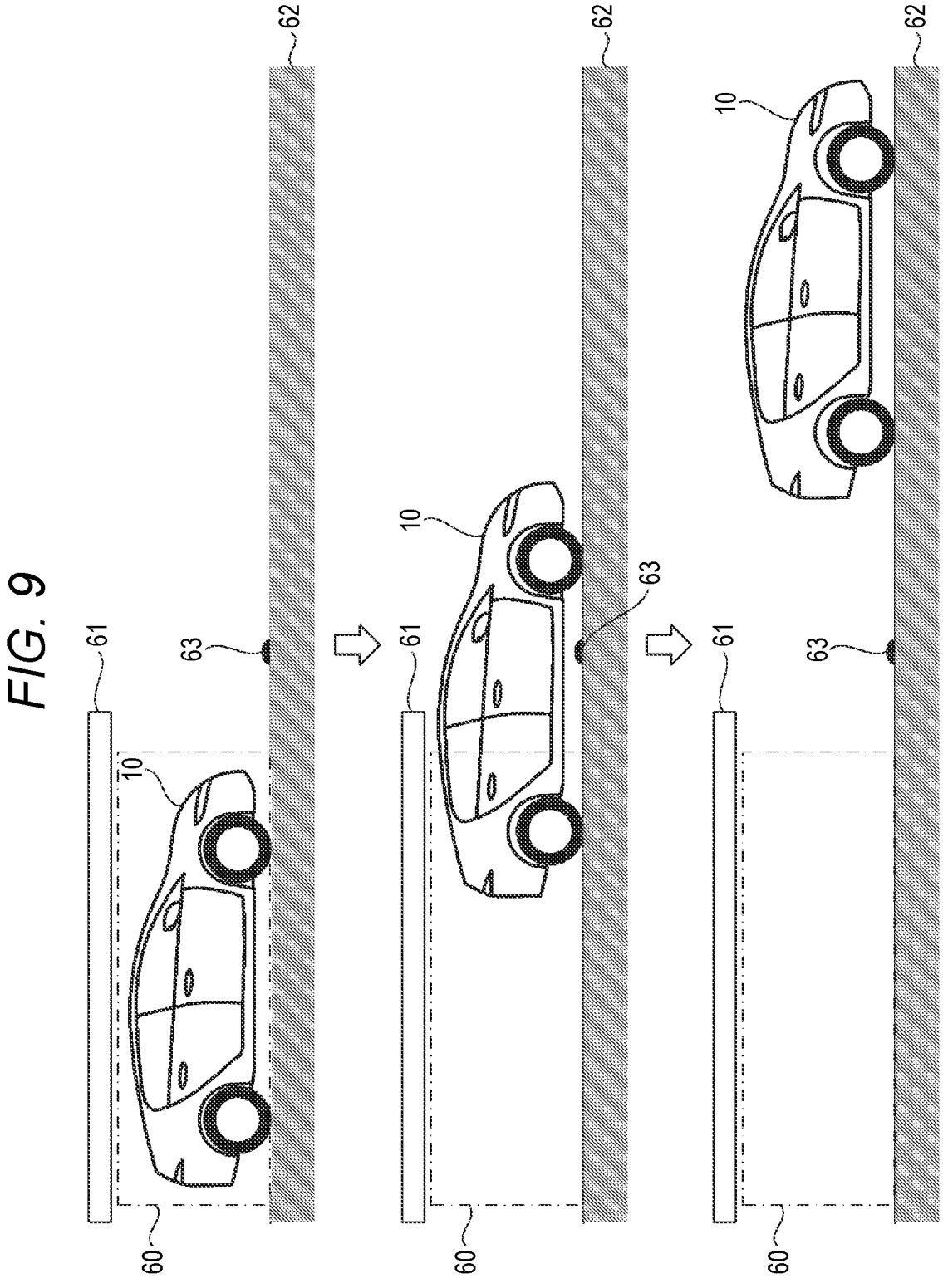
FIG. 9 shows an example of vehicle height control at the time of automatic exit.

The upper diagram in FIG. 9 is a diagram showing a state in which the vehicle 10 has entered the designated target position 60. The vehicle 10 is adjusted to, for example, the height (Lo) of the vehicle 10 at the completion of the automatic entry described in the lower part of FIG. 8, that is, the height suitable for the user to get on and off the vehicle 10. This corresponds to, for example, the processing of step S21 in the exit processing described in FIG. 5 and the processing of step S51 in the exit processing of the modification described in FIG. 7.

The middle diagram in FIG. 8 is a diagram showing a state in which the vehicle 10 is in the process of automatically exiting from the target position 60. Although the middle part of FIG. 8 shows the half-way state, the vehicle 10 adjusts the height of the vehicle 10 to the height (Mid) suitable for the automatic exit in consideration of the heights of the ceiling 61 and the speed bump 63 before the automatic exit is started, and starts the automatic exit after the adjustment of the height (Mid) is completed. This corresponds to, for example, the processing from step S22 to step S24 in the exit processing described in FIG. 5 and the processing from step S52 to step S54 in the exit processing of the modification described in FIG. 7.

The lower diagram in FIG. 9 is a diagram showing a state in which the automatic exit of the vehicle 10 from the target position 60 is completed. When the automatic exit is completed, the vehicle 10 adjusts the height of the vehicle 10 to the height (Hi) during normal traveling. Since the automatic exit is completed, the height (Hi) is a height that is not related to (without need of consideration of) the height of the ceiling 61. This corresponds to, for example, the processing from step S25 to step S27 in the exit processing described in FIG. 5, and the processing from step S55 to step S57 in the exit processing of the modification described in FIG. 7.

In the example shown in the lower part of FIG. 9, the height of the vehicle 10 is adjusted to the height (Hi) after the vehicle 10 completes the automatic exit from the target position 60. However, for example, even before the automatic exit is completed, in a case where the vehicle 10 has left the position where the ceiling 61 is present, the adjustment to change the height of the vehicle 10 to the height (Hi) may be started. This corresponds to, for example, the processing from step S58 to step S61 in the exit processing of the modification described in FIG. 7.

In the example described above, the height of the vehicle 10 during normal traveling is defined as the height (Hi), the height suitable for the automatic entry/automatic exit is defined as the height (Mid) lower than the height (Hi), and the height suitable for the user to get on and off is defined as the height (Lo) lower than the height (Mid), but their height may be replaced for some vehicles.

Second Modification of Processing of Calculation Unit 52 at the Time of Entry Next, a second modification of the entry processing of the calculation unit 52 of the vehicle 10 at the time of the automatic entry will be described. FIG. 10 is a flowchart showing a second modification of the entry processing performed by the calculation unit 52. Upon receiving an entry start operation from the user, the calculation unit 52 starts the processing shown in FIG. 10 as in the entry processing of the first modification in FIG. 6.

As shown in FIG. 10, in the second modification of the entry processing, processing from step S31 to step S42 are the same as the processing from step S31 to step S42 in the first modification of the entry processing described in FIG. 6. Therefore, the description of steps S31 to S42 of the second modification will be omitted.

In the second modification of the entry processing, in a case where the height control of the vehicle 10 is completed in step S38 (step S38: Yes), the notification unit 59 of the calculation unit 52 outputs a message such as "you can get on and off", for example, to the touch panel 42 for notifying the user that it is possible to get on and off the vehicle 10 (step S43).

In step S42, in a case where the height control of the vehicle 10 and the automatic entry control of the vehicle 10 are completed (step S42: Yes), the calculation unit 52 proceeds to step S43 and outputs the boarding and alighting possible message in the same manner as described above.

As described above, according to the second modification of the entry processing, when the control of the height (Lo) suitable for the user to get on and off the vehicle is completed after the automatic entry to the target position is completed, the notification unit 59 of the calculation unit 52 (control device) notifies the user of the message in response to the completion of the height (Lo) control. Accordingly, it is possible to prevent a situation in which the user gets off the vehicle 10 or an ignition switch of the vehicle 10 is turned off though the height control for controlling the height of the vehicle 10 to the height (Lo) suitable for the user to get on and off is completed.

(Third Modification of Processing of Calculation Unit 52 at the Time of Entry)

Figure 11:
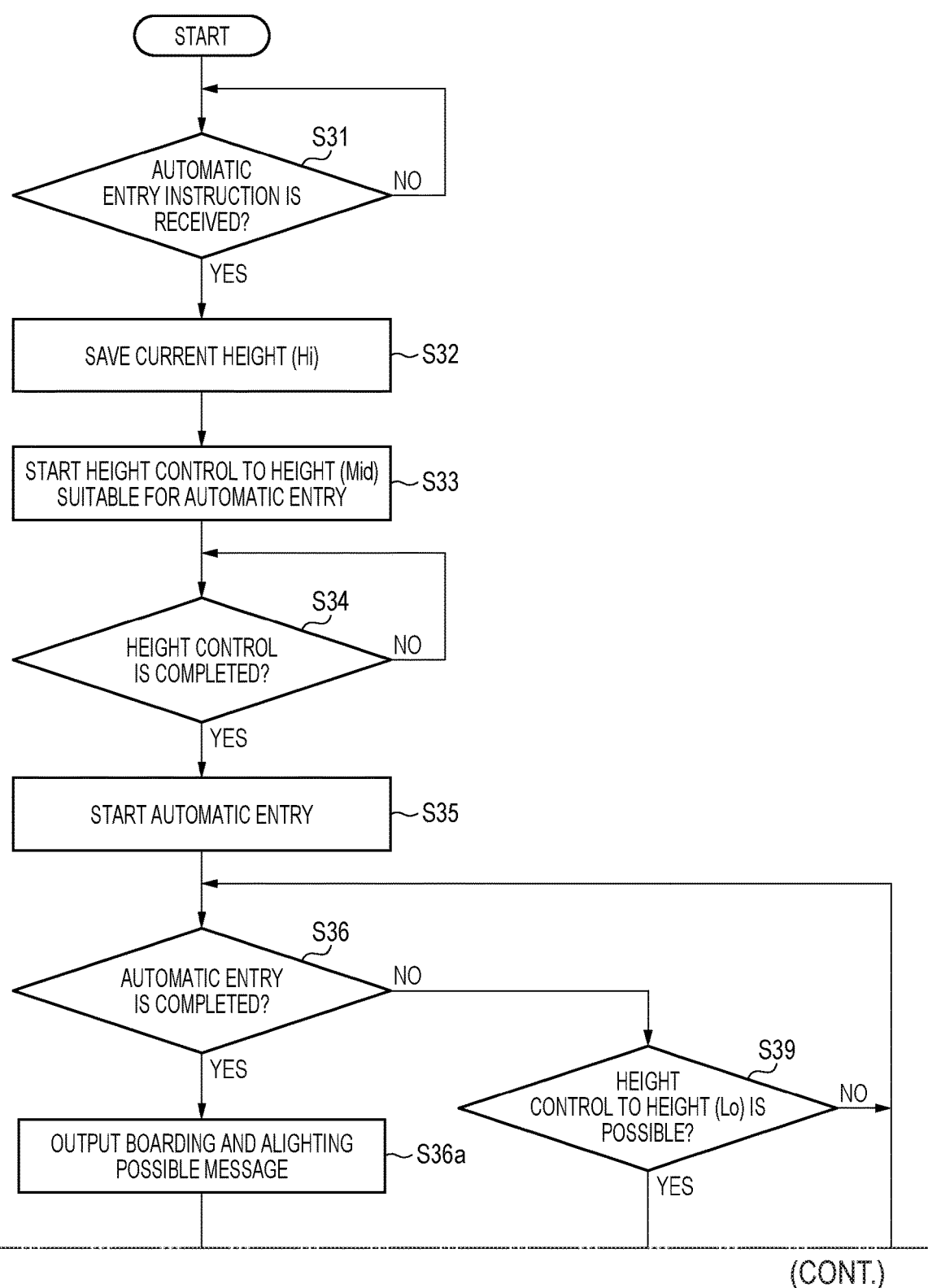
FIG. 11 is a flowchart showing a third modification of the entry processing performed by the calculation unit.

Next, a third modification of the entry processing of the calculation unit 52 of the vehicle 10 at the time of the automatic entry will be described. FIG. 11 is a flowchart showing a third modification of the entry processing performed by the calculation unit 52. Upon receiving an entry start operation from the user, the calculation unit 52 starts the processing shown in FIG. 11 as in the entry processing of the first modification in FIG. 6.

As shown in FIG. 11, in the third modification of the entry processing, processing from step S31 to step S36 are the same as the processing from step S31 to step S36 in the first modification of the entry processing described in FIG. 6. Processing from step S39 to step S42 are the same as the processing from step S39 to step S42 in the first modification of the entry processing described in FIG. 6. Therefore, the descriptions of steps S31 to S36 and the description of steps S39 to S42 in the third modification will be omitted.

In the third modification of the entry processing, in a case where the automatic entry of the vehicle 10 is completed in step S36 (step S36: Yes), the notification unit 59 of the calculation unit 52 outputs a message such as "you can get off the vehicle. Please be careful as the height is being adjusted", for example, to the touch panel 42 for notifying the user that it is possible to get on and off the vehicle 10 (step S36*a*).

Next, the height control unit 58 executes the processing of step S37 and step S38. However, since the processing of step S37 and step S38 is the same as the processing of step S37 and step S38 in the first modification of the entry processing described in FIG. 6, the description thereof will be omitted.

In the third modification of the entry processing, if at least one of the height control of the vehicle 10 and the automatic entry control of the vehicle 10 is not completed in step S42

(step S42: No), the movement control unit 57 determines whether the automatic entry of the vehicle 10 started in step S36 is completed (step S44).

In step S44, in a case where the automatic entry of the vehicle 10 is not completed (step S44: No), the movement control unit 57 returns to step S42 and repeats each processing. In step S44, in a case where the automatic entry of the vehicle 10 is completed (step S44: Yes), the notification unit 59 outputs a message such as "you can get on and off" to the touch panel 42 for notifying the user that it is possible to get on and off the vehicle 10 (step S45), and then returns to step S42 and repeats each processing.

On the other hand, in step S42, in a case where the height control of the vehicle 10 and the automatic entry control of the vehicle 10 are completed (step S42: Yes), the calculation unit 52 ends the entry processing.

As described above, according to the third modification of the entry processing, when the control of the height (Lo) suitable for the user to get on and off the vehicle is completed after the automatic entry to the target position is completed, the notification unit 59 notifies the user of the message in response to the completion of the control of the automatic entry of the vehicle 10. Accordingly, it is possible to prevent the user from waiting for a long period of time until the height control for controlling the height of the vehicle 10 to the height (Lo) suitable for the user to get on and off is completed even though the automatic entry of the vehicle 10 is completed, thereby improving the convenience.

The embodiment of the present disclosure has been described above, but the present disclosure is not limited to the embodiment described above, and modifications, improvements, and the like may be made as appropriate.

For example, in the above embodiment, explanation has been given regarding a case in which the vehicle 10 automatically enters and exits the parking space by automatic steering. For example, the present disclosure may be applied to guidance entry assistance and guidance exit assistance for guiding the vehicle 10 to enter and exit a parking space by the operation of the driver.

The control method described in the embodiment described above may be implemented by executing a control program prepared in advance by a computer. The present control program is recorded in a computer-readable storage medium and executed by being read from the storage medium. Further, the present control program may be provided in a form stored in a non-transitory storage medium such as a flash memory, or may be provided via a network such as the Internet. The computer that executes the present control program may be provided in the control device, may be provided in an electronic device such as a smartphone, a tablet terminal, or a personal computer that can communicate with the control device, or may be provided in a server device that can communicate with the control device and the electronic device.

In the present specification, at least the following matters are described. Although corresponding constituent elements or the like in the above-described embodiment are shown in parentheses, the present invention is not limited thereto.

(1) A control device including:

an external environment recognition unit (external environment recognition unit 55) configured to acquire recognition data of an external environment of a moving body (vehicle 10);

a reception unit (reception unit 56) configured to receive selection of a target position from a user of the moving body;

a movement control unit (movement control unit 57) configured to execute movement control for moving the moving body to the target position based on the recognition data; and a height control unit (height control unit 58) configured to execute height control of the moving body in accordance with progress of the movement control.

According to (1), since the height control of the moving body is performed in conjunction with the movement control for moving the moving body to the target position such as a parking place, it is possible to appropriately adjust the height of the moving body when moving to the target position, and for example, it is possible to improve convenience for a user to get on and off the moving body.

(2) The control device according to (1), in which the height control unit starts the height control in response to completion of the movement control.

As in (2), the timing of starting the height control of the moving body is preferably triggered by the completion of the movement control.

(3) The control device according to (1) or (2), in which the height control unit starts the height control according to an acquisition state of the recognition data during execution of the movement control.

According to (3), since the height control of the moving body may be started before the moving body arrives at the target position, the time for waiting for the completion of the height control at the target position may be reduced, and the convenience may be improved.

(4) The control device according to (3), in which the height control unit determines whether the height control is possible based on the recognition data during the execution of the movement control, and starts the height control according to a result of the determination.

According to (4), since the height control of the moving body may be started before the moving body arrives at the target position, the time for waiting for the completion of the height control at the target position may be reduced, and the convenience may be improved.

(5) The control device according to any one of (1) to (4), in which the height control unit executes first height control of the moving body based on the recognition data before starting the movement control, and starts second height control of the moving body different from the first height control in response to completion of the movement control or during execution of the movement control.

According to (5), it is possible to control the height of the moving body to an appropriate height according to a movement state of the moving body.

(6) The control device according to (5), in which the first height control is height control of the moving body to a height at which the movement control is possible, and the second height control is height control of the moving body to a height more suitable for a user to get on and off the moving body than the height at which the movement control is possible.

According to (6), it is possible to control the height of the moving body to an appropriate height at the time of the movement control of the moving body and when the user gets on and off the moving body.

(7) The control device according to (5) or (6), in which the movement control unit executes movement control for moving the moving body from the target position, and the height control unit stores a height of the moving body before starting the first height control, and executes height control of the moving body to the stored height in response to completion of the movement control for moving the moving body from the target position.

According to (7), when the movement control of the moving body is completed, it is possible to automatically return the height to an original height different from the height at the time of the movement control, so that an instruction of height adjustment by the user becomes unnecessary, and the convenience may be improved.

(8) The control device according to any one of (1) to (7), in which the height control unit acquires type information indicating a type of the moving body and executes the height control based on the type information.

According to (8), since the control device controls the height based on the type of the moving body, the same control device may be applied to a plurality of types of moving bodies.

(9) The control device according to any one of (1) to (8), further including:

a notification unit configured to perform notification to the user in response to completion of the height control in a case where the height control is completed after completion of the movement control to the target position.

According to (9), it is possible to prevent a situation in which the user gets off the moving body or the ignition switch of the moving body is turned off before the completion of the height control.

(10) The control device according to any one of (1) to (8), further including:

a notification unit configured to perform notification to the user in response to completion of the movement control in a case where the height control is completed after completion of the movement control to the target position.

According to (10), the convenience may be improved by preventing the user from waiting until the height control of the moving body is completed.

(11) The control device according to (10), in which the height control unit continues the height control even when the user gets off the moving body before completion of the height control.

According to (11), by continuing and completing the height control even when the user gets off the moving body, it is possible to keep the height suitable for the user to get on the moving body next time, and the convenience may be improved.

(12) A control method performed by a control device, the control method including:

acquiring recognition data of an external environment of a moving body;

accepting selection of a target position from a user of the moving body;

executing movement control for moving the moving body to the target position based on the recognition data; and executing height control of the moving body according to progress of the movement control.

According to (12), since the height control of the moving body is performed in conjunction with the movement control for moving the moving body to the target position such as a parking place, it is possible to appropriately adjust the height of the moving body when moving to the target position, and for example, it is possible to improve convenience for a user to get on and off the moving body.

(13) A non-transitory computer readable storage medium storing a control program for a control device, the control program being configured to cause a processor of the control device to execute a process including:

acquiring recognition data of an external environment of a moving body;

accepting selection of a target position from a user of the moving body;

executing movement control for moving the moving body to the target position based on the recognition data; and executing height control of the moving body according to progress of the movement control.

According to (13), since the height control of the moving body is performed in conjunction with the movement control for moving the moving body to the target position such as a parking place, it is possible to appropriately adjust the height of the moving body when moving to the target position, and for example, it is possible to improve convenience for a user to get on and off the moving body.

What is claimed is:

1. A control device comprising:

a processor configured to:

acquire recognition data of an external environment of a moving body;

receive selection of a target position from a user of the moving body;

execute movement control for moving the moving body to the target position based on the recognition data;

execute height control of the moving body in accordance with progress of the movement control; and determine whether the height control is possible based on the recognition data and start the height control according to a result of the determination.

2. The control device according to claim 1, wherein the processor executes first height control of the moving body based on the recognition data before starting the movement control, and starts second height control of the moving body different from the first height control in response to completion of the movement control or during execution of the movement control.

3. The control device according to claim 2, wherein the first height control is height control of the moving body to a height at which the movement control is possible, and the second height control is height control of the moving body to a height more suitable for a user to get on and off the moving body than the height at which movement control is possible.

4. The control device according to claim 2, wherein the processor executes movement control for moving the moving body from the target position, stores a height of the moving body before starting the first height control, and executes height control of the moving body to the stored height in response to completion of the movement control for moving the moving body from the target position.

5. The control device according to claim 1, wherein the processor starts the height control in response to completion of the movement control.

6. The control device according to claim 1, wherein the processor acquires type information indicating a type of the moving body and executes the height control based on the type information.

7. The control device according to claim 1, wherein the processor is further configured to:

perform notification to the user in response to completion of the height control in a case where the height control is completed after completion of the movement control to the target position.

8. The control device according to claim 1, wherein the processor is further configured to:

perform notification to the user in response to completion of the movement control in a case where the height control is completed after completion of the movement control to the target position.

9. The control device according to claim 1, wherein the processor continues the height control even when the user gets off the moving body before completion of the height control.

10. The control device according to claim 1, wherein the processor is configured to determine whether it is possible to move the moving body to the target position based on the acquired recognition data.

11. A control method performed by a control device, the control method comprising:

acquiring recognition data of an external environment of a moving body;

accepting selection of a target position from a user of the moving body;

executing movement control for moving the moving body to the target position based on the recognition data;

executing height control of the moving body according to progress of the movement control; and determining whether the height control is possible based on the recognition data and starting the height control according to a result of the determination.

12. A non-transitory computer readable storage medium storing a control program for a control device, the control program being configured to cause a processor of the control device to execute a process comprising:

acquiring recognition data of an external environment of a moving body;

accepting selection of a target position from a user of the moving body;

executing movement control for moving the moving body to the target position based on the recognition data;

executing height control of the moving body according to progress of the movement control; and determining whether the height control is possible based on the recognition data and starting the height control according to a result of the determination.

13. A control device comprising:

a processor configured to:

acquire recognition data of an external environment of a moving body;

receive selection of a target position from a user of the moving body;

execute movement control for moving the moving body to the target position based on the recognition data;

execute height control of the moving body in accordance with progress of the movement control; and perform notification to the user in response to completion of the movement control or of the height control in a case where the height control is completed after completion of the movement control to the target position.

* * * * *